53-509
M1813

$$$ SR
XR T 857,006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 42

650,046

METHOD AND APPARATUS FOR CURTAIN COATING ARTICLES WITH A HOT MELT ON A CONTINUOUS MOVING AIR-PERMEABLE SUBSTRATE

Rex Eells and David Emory Stooksbury, both % Tennessee Eastman Company, P.O. Box 511, Kingsport, Tenn. 37662

Continuation-in-part of application Ser. No. 608,607, Jan. 11, 1967. This application June 29, 1967. Published Dec. 3, 1968

Class 264—90

2 Sheets Drawings. 16 Pages Specification

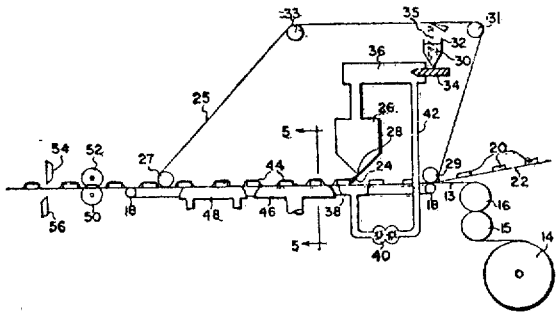

Figure 1:
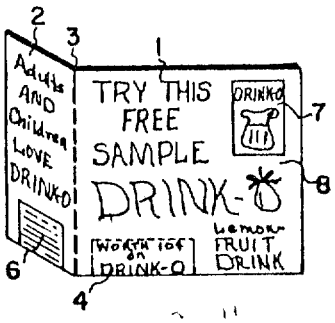
Figure 2:
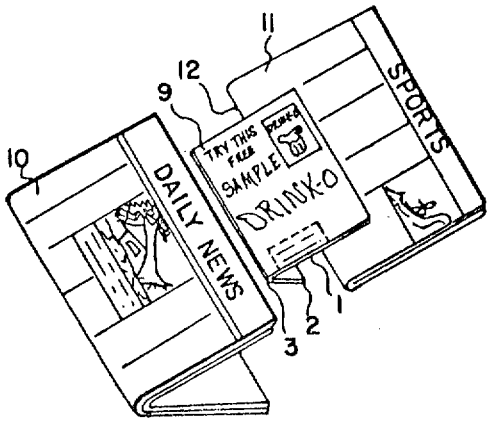
Figure 3:
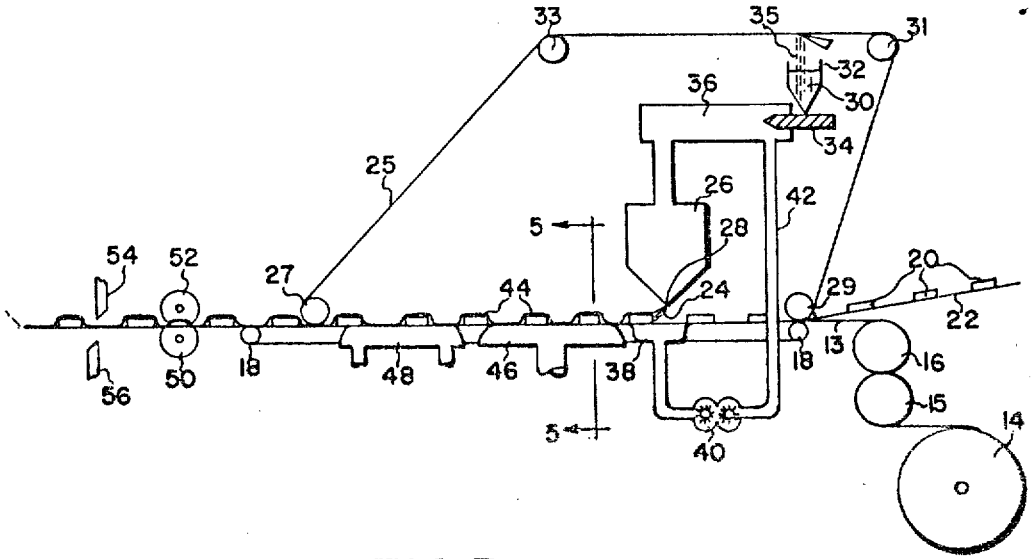
Figure 4:
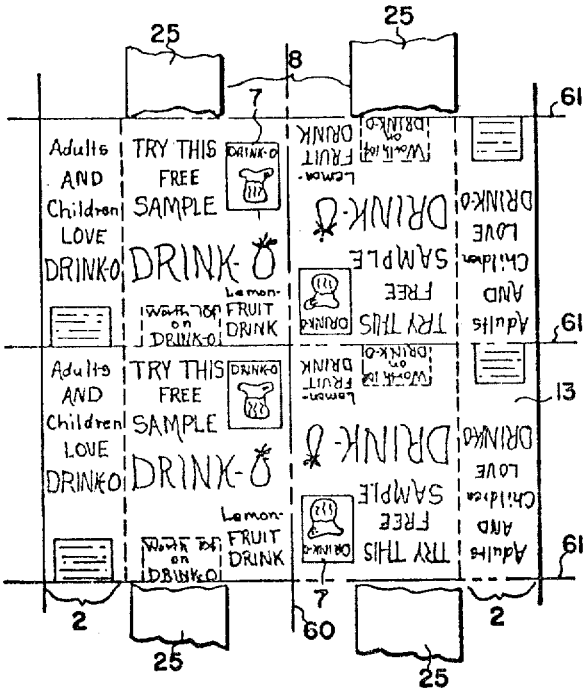
Figure 5:
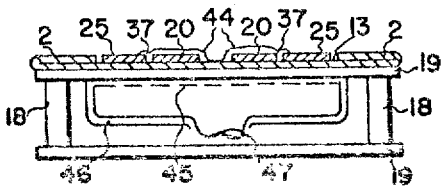

Method and apparatus, as illustrated in FIGURE 3, for preparing periodical inserts by packaging articles supported on an air-permeable web in large numbers at high speed employing a falling curtain of hot molten rather viscous thermoplastic material, which is continuously deposited as a preferably transparent film on the articles and web while in motion above vacuum producing means so as to draw the film into close contact. The web may have repeating printing or decorations thereon with the articles placed at certain precise locations on the web in order to fit the printing or decoration. An endless moving band can be positioned along one or both sides of the moving web so as to intercept excess thermoplastic material which can advantageously be removed from the band and returned to the curtain forming means. These bands may be used to provide the curtain with neat, straight edges and to define the area coated by the curtain.

This is a continuation-in-part of copending application, Serial No. 608,607, filed Jan. 11, 1967.

53-509
M1813

$$$ SR
XR T 857,006

Draw Page 1

Rex Eells
David Emory Stooksbury
INVENTORS

BY William T. French
Charles L. Ford
ATTORNEYS 53-509 $$$ SR

M1813 XR T 857,006

Draw page 2

Rex Ellis
David Emory Stocksbury
INVENTORS

BY William T. Fryer
Albert E. Wood
ATTORNEYS